(12) United States Patent
Wang et al.

(10) Patent No.: US 7,860,703 B2
(45) Date of Patent: Dec. 28, 2010

(54) TIMING CONTROL METHOD OF HARDWARE-SIMULATING PROGRAM AND APPLICATION OF THE SAME

(75) Inventors: John C. Wang, Taipei (TW); Mu-Yi Chen, Taipei (TW); Yung-Chieh Lin, Taipei (TW)

(73) Assignee: Iadea Corporation, Taipei (TW)

( * ) Notice: Subject to any disclaimer, the term of this patent is extended or adjusted under 35 U.S.C. 154(b) by 659 days.

(21) Appl. No.: 11/841,479

(22) Filed: Aug. 20, 2007

(65) Prior Publication Data

US 2007/0288221 A1    Dec. 13, 2007

Related U.S. Application Data (63) Continuation-in-part of application No. 10/826,991, filed on Apr. 19, 2004, now abandoned.

(51) Int. Cl.
    *G06F 17/50* (2006.01)

(52) U.S. Cl. .............................. 703/19; 703/14; 703/17

(58) Field of Classification Search .................. 703/13, 703/14, 17, 19, 20, 22
    See application file for complete search history.

(56) References Cited

U.S. PATENT DOCUMENTS

| 6,230,114 | B1 | 5/2001 | Hellestrand et al. |
| 6,980,945 | B2 | 12/2005 | Elias |
| 7,308,393 | B2 * | 12/2007 | Lumpkin et al. ............. 703/13 |
| 7,512,728 | B2 * | 3/2009 | Tseng ........................ 710/100 |
| 2004/0102946 | A1 | 5/2004 | Shahabuddin et al. |
| 2006/0117274 | A1 * | 6/2006 | Tseng et al. ................... 716/1 |

* cited by examiner

*Primary Examiner*—Russell Frejd (57) ABSTRACT

A timing-control method of a hardware-simulating program can be applied to a software platform for facilitating control program development. The hardware-simulating program can be recorded in any suitable recording medium and defines therein a plurality of simulating elements which are automatically synchronized at intervals by setting specified time points as aligning points. The specified time points are set with adjustable intervals. By adjusting an interval between adjacent specified time points, the simulating speed between the adjacent specified time points can be changed to comply with practical requirements.

10 Claims, 6 Drawing Sheets

TIMING CONTROL METHOD OF HARDWARE-SIMULATING PROGRAM AND APPLICATION OF THE SAME

CROSS REFERENCE TO RELATED PATENT APPLICATION

This patent application is a continuation-in-part (CIP) application of a U.S. patent application Ser. No. 10/826,991 filed Apr. 19, 2004. The contents of the related patent application are incorporated herein for reference.

FIELD OF THE INVENTION

The present invention relates to a timing control method of a software program, and more particularly to a timing control method of a hardware-simulating program. The present invention also relates to a software platform for designing hardware control programs thereby according to the hardware-simulating program.

BACKGROUND OF THE INVENTION

One of the most popular programmable integrated circuits (ICs) is a central processing unit (CPU) applied to a personal computer system. Due to the increasing requirements on rapid and reliable operational ability and a variety of complicate functions of a CPU, lots of time and money are spent in designing a powerful CPU. Accordingly, the CPU is generally costly. For meeting the requirements on competitive prices and flexible applications of consumer IC products, e.g. audio/video apparatus, electrical appliances, electrical toys, watches, personal digital assistants (PDAs), mobile or cellular phones, etc., another programmable IC that is so called as a micro-controller unit (MCU) is used in lieu of the costly CPU in the uni-chip system.

Figure 1:
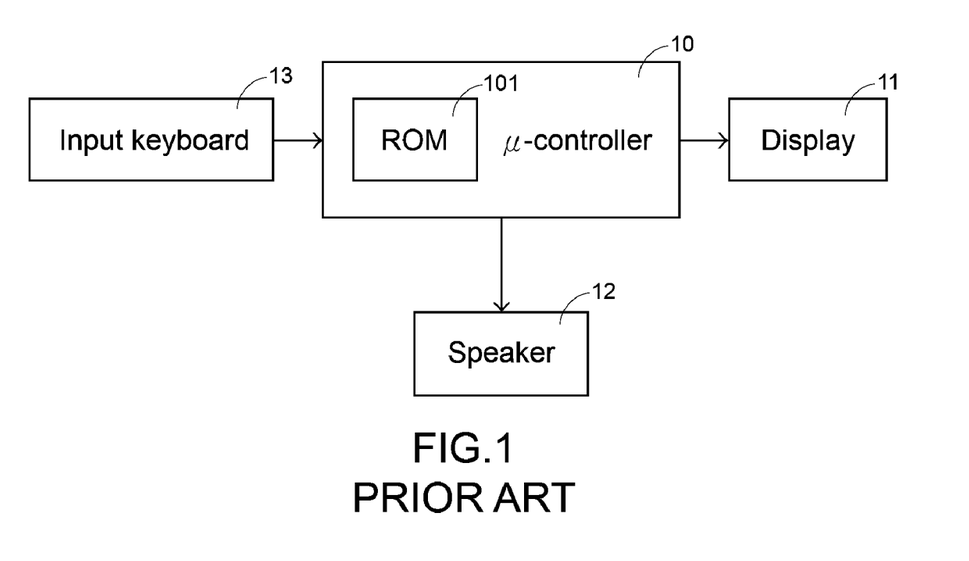
FIG. 1 is a schematic block diagram showing a microcontroller and several peripheral equipments controlled thereby.

Please refer to FIG. 1 which shows the use of a micro-controller for coordinating a plurality of peripheral equipment devices. For example, the micro-controller 10 controls a display 11, a speaker 12 and an input device such as a keyboard 13 by way of the control program codes stored in a read-only memory (ROM) 101 in the micro-controller 10 and associated with the operations of these peripheral equipment devices. In other words, by varying control program codes inside the micro-controller 10, various controls can be implemented.

For supplying the clients with desired products, micro-controller chip manufacturers are required to provide hardware platforms for the clients to write in control program codes and perform test and debug operations thereby. Generally, the hardware platforms are specific to certain IC products. In other words, different IC products may need different hardware platforms to write in control program codes and perform test and debug operations. Since hardware platforms are high in cost and complicate in architecture, and the circulating period of common IC products, particularly consumer IC products, becomes shorter and shorter, the use of such conventional hardware platforms is time- and cost-inefficient.

SUMMARY OF THE INVENTION

Therefore, the present invention provides a software platform in lieu of the hardware platform to write in control program codes and perform test and debug operations thereby for improving flexibility and reducing cost.

According to an aspect of the present invention, a plurality of simulating elements are defined in the hardware-simulating program, and a timing control method of the hardware-simulating program includes steps of: a) executing the simulating elements in a first stage; b) suspending execution of any of the simulating elements that has been executed to a certain degree in the first stage; and c) resuming execution of all the simulating elements suspended in the first stage to start a second stage when a first specified time point based on an external time coordinate is due; wherein the first specified time point is adjustable to change a simulating speed of the hardware-simulating program in the first stage.

The timing control method may further include steps of: d) suspending execution of any of the simulating elements that has been executed to a further degree in the second stage; and e) resuming execution of all the simulating elements suspended in the second stage to start a third stage when a second specified time point based on the external time coordinate is due. Preferably, the second specified time point is adjustable to change a simulating speed of the hardware-simulating program in the second stage, independently from the first stage, so that the hardware-simulating program is executable by different simulating speeds at different stages.

In an embodiment, the external time coordinate is a system clock.

In an embodiment, the simulating speed of the hardware-simulating program is decreased by putting off the first specified time point in the external time coordinate, and increased by advancing the first specified time point in the external time coordinate.

In an embodiment, in the step b), it is determined that the simulating element has executed to the certain degree when an accumulated number of executed machine cycles of the simulating element reaches or exceeds a first threshold.

In an embodiment, the steps b) and c) are enabled by one of the simulating elements.

In an embodiment, in the step a), the simulating elements are executed in mixed program sections according to a predetermined sequence. In this embodiment, the simulating elements can be executed by the same microcontroller.

In an embodiment, the simulating elements are executed by respective microcontrollers.

In an embodiment, the step a) further comprises sub-steps of: attaching time tags to simulation data associated with a specified simulating element; storing the simulation data into a queue; and reading out the simulation data from the queue according to the time tags when it is the turn of the specified simulating element to operate.

Another aspect of the present invention relates to a software platform for facilitating control program development, which allows a hardware-simulating program to work thereon. The hardware-simulating program defines therein a plurality of simulating elements, and a timing control method of the hardware-simulating program includes steps of: a) executing the simulating elements in a first stage; b) suspending execution of any of the simulating elements that has been executed to a certain degree in the first stage; and c) resuming execution of all the simulating elements suspended in the first stage to start a second stage when a first specified time point based on an external time coordinate is due; wherein the first specified time point is adjustable to change a simulating speed of the hardware-simulating program in the first stage.

Preferably, the timing control method further includes steps of: d) suspending execution of any of the simulating elements that has been executed to a further degree in the second stage; and e) resuming execution of all the simulating elements suspended in the second stage to start a third stage when a second specified time point based on the external time coordinate is due; wherein the second specified time point is adjustable to change a simulating speed of the hardware-simulating program in the second stage, independently from the first stage, so that the hardware-simulating program is executable by different simulating speeds at different stages.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

According to the present invention, a software platform is to be provided for the microcontroller designer to write in control program codes and perform test and debug operations thereby. In principle, a hardware-simulating program is used to execute the function of the hardware so as to achieve the above-mentioned purposes.

One of the simulation technologies was developed based on electronic design automation (EDA) concepts. Since it is necessary to calculate the theoretical performance of each of the logic gates in each of the ICs so as to simulate the behaviors of the IC circuitry, the time spent on simulation is remarkable. For example, a certain operation taking a real microcontroller a few seconds to execute may take a super computer a few days to simulate. As is understood by those skilled in the art, the real time response should be taken into consideration to perfect the design of a micro-controller. Unfortunately, this simulation technology can hardly reflect this important feature.

Another simulation technology, which is considered as one of the most feasible hardware-simulating ways, is to simulate the operation states of the micro-controller at the instruction-set level. It is advantageous in real-time simulation easily implemented with simplified calculation executable by a common personal computer. Therefore, this simulation technology is satisfying in design cost and running speed. Nevertheless, there still are some defects for this conventional simulation technology to be used in the software platform of the present invention.

In general, this simulation technology is developed for education purpose to perform single-chip software simulation, e.g. applied to the non real-time 8051-microcontroller software simulator, or applied to game simulators.

Such simulation technology, due to inherent technical defects, is not suitable to be applied to consumer electronic products. For example, the conventional simulation technology applied to video game consoles is accurate to a level of $1/30 \sim 1/10$ second (i.e. about 33~100 milliseconds). On the other hand, the single-chip software simulator such as 8051 microcontroller simulator is even less accurate. The operational speed of these simulators is usually not stable and hardly predictable, and is thus subject to deviation from real situation. The big timing tolerance is adverse to the performance of consumer electronic products, particularly to the sonic devices which requires accuracy up to $1/10000$ second (i.e. about 0.1 milliseconds) to well simulate the practical operations of a hardware.

Therefore, the timing control of the simulation technology should be further improved to be applicable to the software platform of the present invention. Once the user can realize the real-time response of the hardware to be simulated, e.g. a microcontroller, the write-in operation of the control program codes and the subsequent test and debug operations will have a precise and reliable base. In order to achieve this purpose, the present invention provides an improved simulating method and a software platform implemented with this improved simulating method, which will be described hereinafter.

Figure 2:
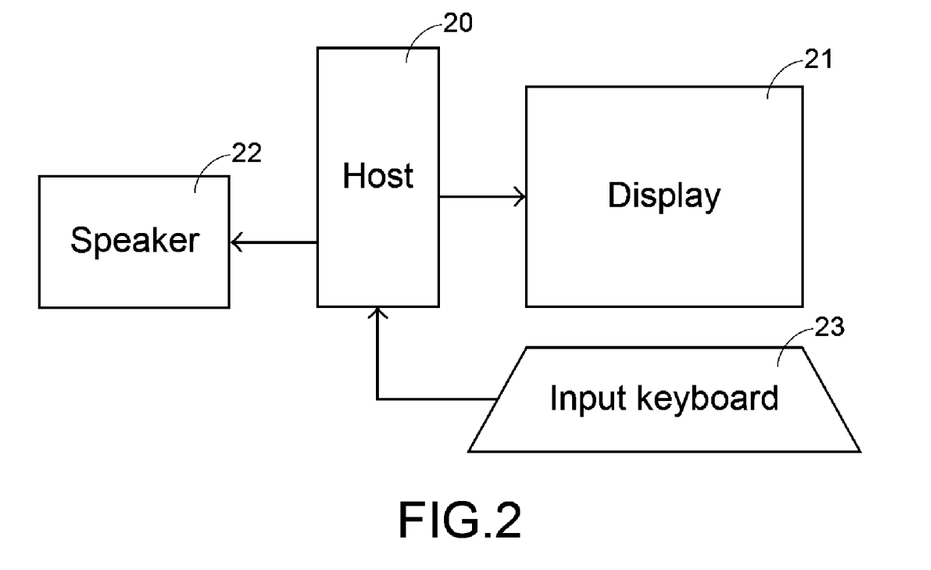
FIG. 2 is a schematic block diagram showing the use of a personal computer to simulate the control scheme of FIG. 1.

Please refer to FIG. 2. A personal computer system comprising a host 20, an input keyboard 23, a speaker 22 and a display 21 is shown. By way of the personal computer system, a software platform and a timing control method of a hardware-simulating program implemented thereon according to the present invention are exemplified. The instruction set executed when the microcontroller controls the peripheral devices, e.g. the input keyboard 23, speaker 22 and display 21, is simulated with a hardware-simulating program, whose executive codes are derived from source codes by an assembler and a linker applicable to the microcontroller to be simulated.

Figure 3A:
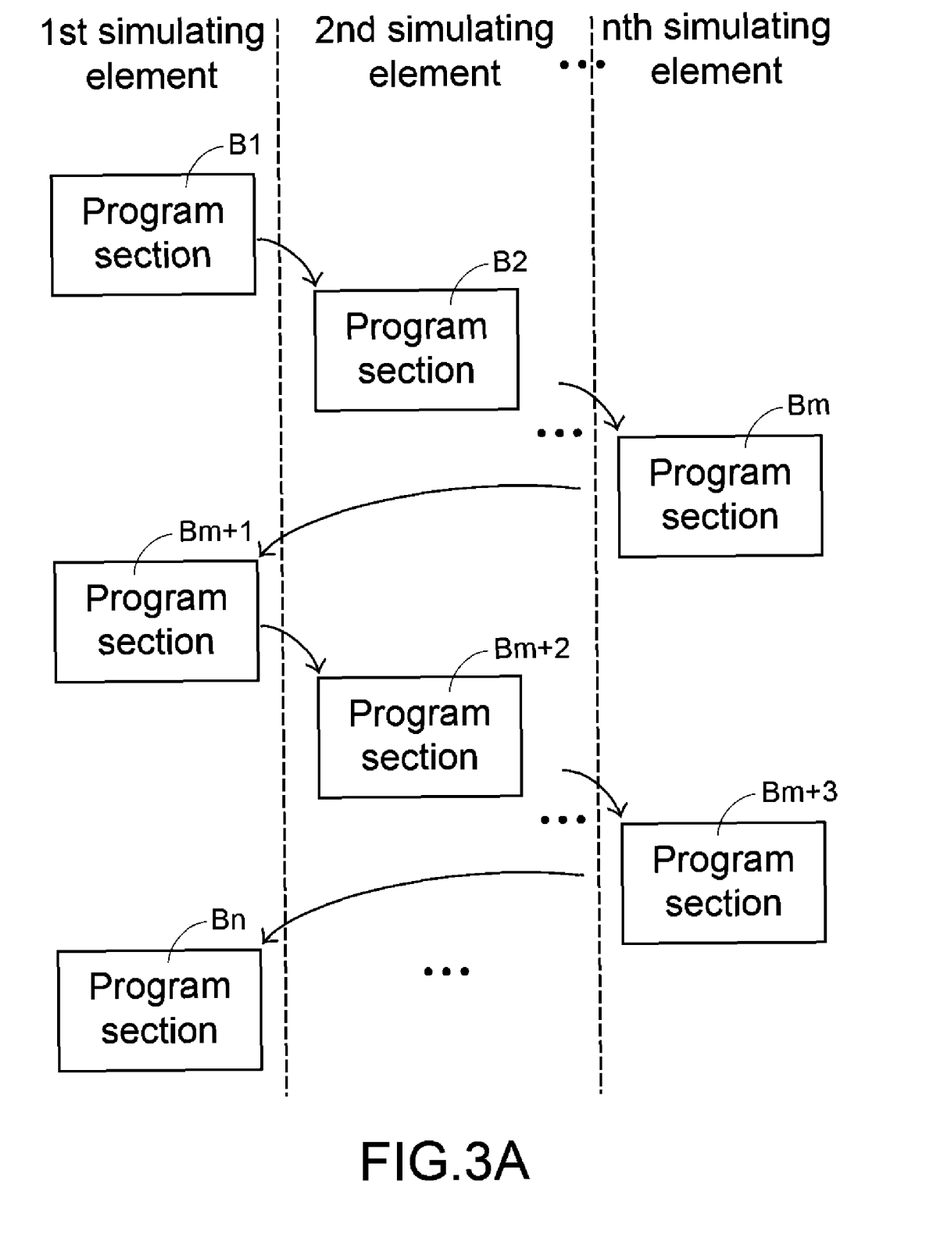
FIG. 3 is a schematic diagram exemplifying the piecewise and sequential execution states of a plurality simulating elements defined in the simulating program.

In the hardware-simulating programs, a plurality of simulating elements are defined and executed piecewise according to a predetermined sequence. Prior to executing the simulating elements, a booting procedure of the microcontroller is simulated. The simulated microcontroller starts the execution with the first command indicated by a boot vector realized according to the simulated program counter. Subsequently, the simulating elements are executed in the predetermined sequence. Referring to FIG. 3A, the piecewise and sequential execution states of the simulating elements are exemplified, wherein each of the blocks B1~Bn represents a section of one of the simulating elements. The execution time of each of the simulating elements is accumulatively counted and recorded. When the accumulated execution time for each single simulating element has reached or exceeded a threshold period, it means that the simulating elements have been executed to a certain degree. In an embodiment, the accumulated execution time is realized by counting the machine cycles of the executed program sections for respective simulating elements. When the count of the machine cycles for each of the simulating elements has reached or exceeded a threshold number, it means the simulating elements have been executed to the certain degree.

Figure 3B:
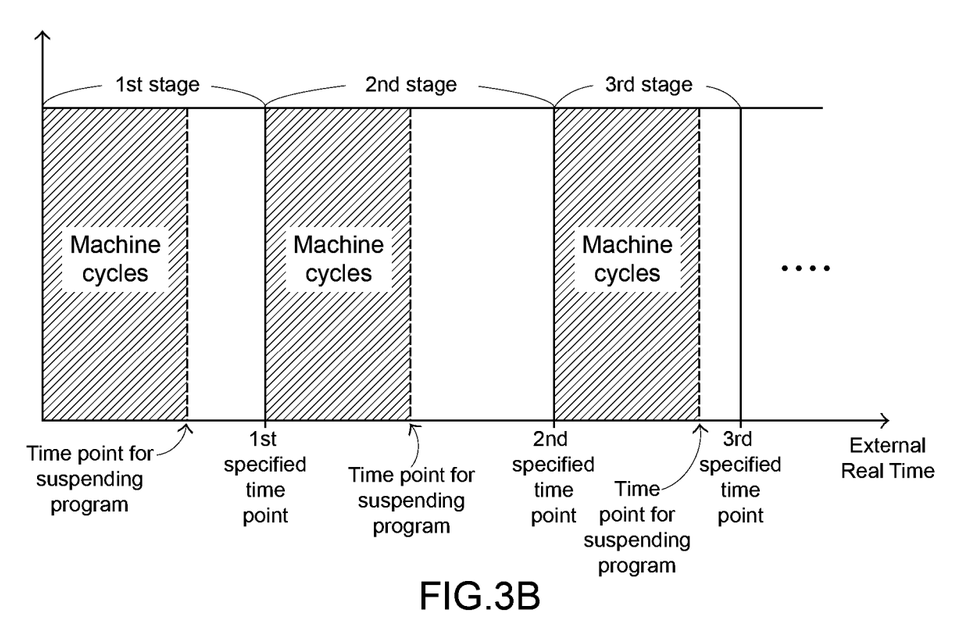
FIG. 3B is a schematic diagram exemplifying the segmenting of a hardware-simulating program according to an embodiment of the present invention.

The numbers of machine cycles are accumulated for respective simulating elements while sequentially executing the program sections. If there is a count of machine cycles for any of the simulating elements reaching or exceeding the threshold number, the execution of subsequent program sections of that simulating element is suspended while the program sections of other simulating elements are continuously executed. Once the numbers of machine cycles for all of the simulating elements have reached or exceeded the threshold number, all simulating elements are suspended. Meanwhile, current time based on external real time, e.g. based on system clock, is realized. The execution of subsequent program sections of the simulating elements then resumes at a specified time point in a time coordinate set on the real time basis, and the accumulation of machine-cycle numbers also starts over. In next stage, the numbers of machine cycles are likewise accumulated for respective simulating elements while sequentially executing the program sections. If there is a count of machine cycles for any of the simulating elements reaching or exceeding the threshold number or a different threshold number, the execution of subsequent program sections of that simulating element is suspended while the program sections of other simulating elements are continuously executed. Once the numbers of machine cycles for all of the simulating elements have reached or exceeded the threshold number, all simulating elements are suspended. Meanwhile, current time based on external real time is realized. The execution of subsequent program sections of the simulating elements then resumes at another specified time point set on the real time basis. The rest may be deduced by analogy, as illustrated in FIG. 3B.

The number of the specified time points or stages is optional. It is to be noted, however, that if the specified time points have small intervals, the synchronizing accuracy would be improved, but the operation amount of the system would be enormous.

In an embodiment, whether the current time has reached the specified time points is determined by one of the simulating elements that are sensible to time. For example, an audio and/or video player is a preferable choice.

In the embodiment illustrated with reference to FIG. 3A, a single microcontroller is used for executing the simulating elements with mixed program sections according to the predetermined sequence. Alternatively, the simulating elements can be executed by respective microcontrollers.

Figure 3C:
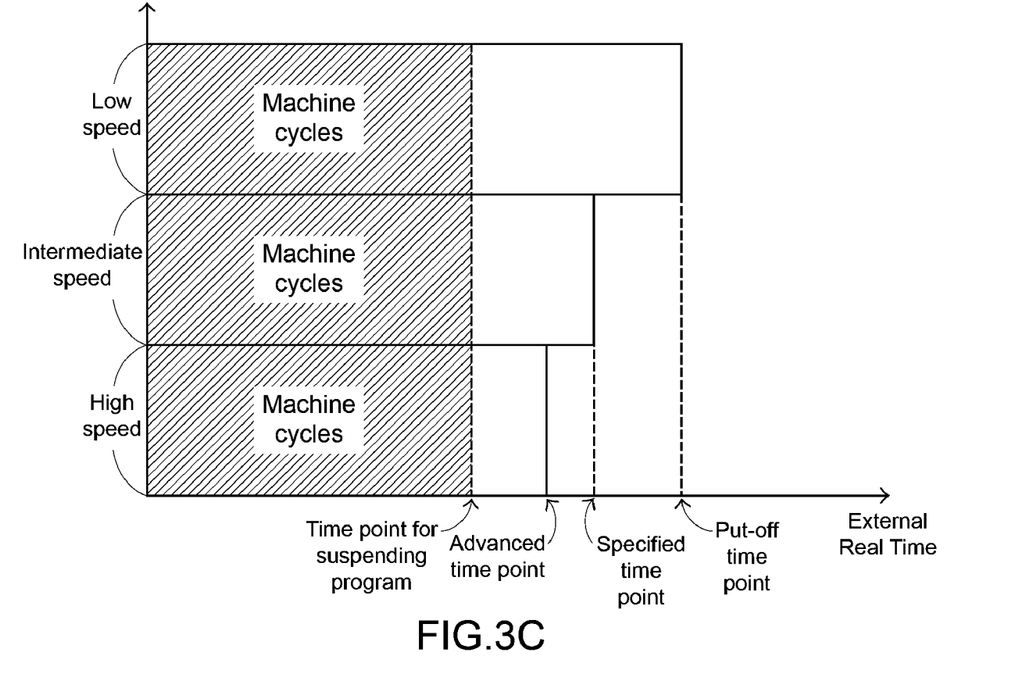
FIG. 3C is a schematic diagram exemplifying the adjustment of a specified point for changing simulating speed.

In general, it takes different durations for microcontrollers with different operational speeds to execute a program section with the same count of machine cycles. By segmenting a program into stages with a plurality of well allocated time points and optionally suspending the execution of the program through the specified time point in each stage, the execution rate of the program executed by different microcontrollers can be leveled. Furthermore, on the condition of the same count of machine cycles, the execution rate of the program in a stage can be adjusted by shifting the specified time point. For example, the actual speed of the simulated device can be revealed by setting a first specified time point, while revealing a lower speed by setting a time point later than the first specified time point or revealing a higher speed by setting a time point sooner than the first specified time point, as illustrated in FIG. 3C.

Figure 4:
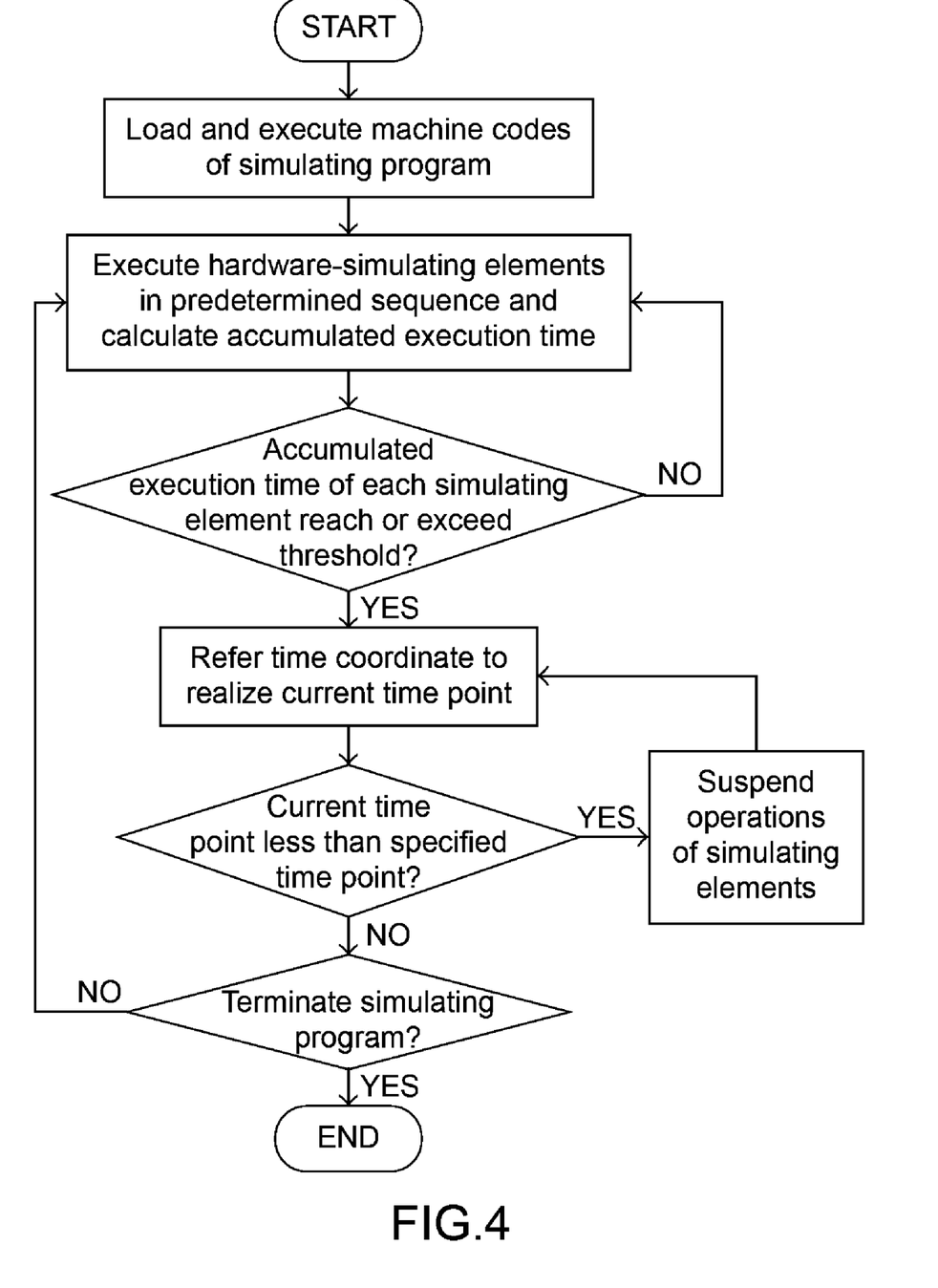
FIG. 4 is a flowchart illustrating a time control method of a hardware-simulating program according to an embodiment of the present invention.

With proper specified time points, the timing control method of the above embodiment is summarized as a flowchart as shown in FIG. 4.

Since the simulating program mentioned above is used for simulating the peripheral equipments such as the input keyboard, speaker and display as well as the microcontroller, there are preferably data queues corresponding to those hardware-simulating elements for storing the data to be processed, and the data should be attached with time tags. For example, when the input keyboard of the system is pressed down, the hardware-simulating element associated with the input keyboard generates and transmits an entry of image data to the display to be shown. The entry of image data are attached with a time tag, and then stored into a queue corresponding to the hardware-simulating element associated with the display. Afterwards, when it is the turn of the hardware-simulating element associated with the display, the entry of image data are read out from the queue and shown by the display according to the time specified by the time tag. Further with the aid of the timing control method according to the present invention, the simulating operations can be well performed in a nearly real-time mode.

The present invention is particularly useful for simulating the audio control of the microcontroller. When the input keyboard of the system is pressed down, the hardware-simulating element associated with the input keyboard generates and transmits an entry of audio data to the speaker to be outputted. The entry of audio data are attached with a time tag, and then stored into a queue corresponding to the hardware-simulating element associated with the speaker. Afterwards, when it is the turn of the hardware-simulating element associated with the speaker, the entry of audio data are read out from the queue and digital-to analog converted by the hardware-simulating element. When a buffer of the system has been occupied by the audio data, the audio data will be played by the speaker according to the time and sequence specified by the time tags. Since the audio output is much more sensitive than the other kinds of output, the real-time simulation of the audio output becomes more important than the other one. Therefore, the hardware-simulating element associated with the speaker can be further modified to improve the simulated audio effect. For example, in order to assure of correct pitch and tone, the timing accuracy of the speaker control means should be as accurate as about $1/44100$ second (about 0.0227 millisecond or 22.7 microsecond). Plural sampled digital signals constitute the entry of audio data, and the sampled digital signals are obtained in a certain sequence by processing the original audio data with an interleaving protocol according to the time tags. The intervals between every two sampled points in the sequence should be made equal to comply with the specification of common buffers. By this way, after the digital-to-analog converting operation, the speaker can be driven to output correct pitch and tone.

Since human cannot tell the video/audio signals having a deviation period less than 40 milliseconds, it is proper to set the execution time of each section of the hardware-simulating elements mentioned in the above embodiment to be about 20 milliseconds. In view of the burden of a common computer system, it is proper to set the interval of every two adjacent specified points to be 40 milliseconds. To this degree, satisfactory real-time interaction can be achieved.

It is clear from the above description that the simulation conducted according to the present invention approximates the real state of the simulated hardware due to the synchronization mechanism. By using the specified time points as aligning points, synchronization can still be achieved even if the simulating elements are respectively run by different microcontrollers with different operational speeds. Accordingly, the user can accurately realize the real response of the simulated hardware, e.g. microcontroller. By using the software platform implementing the present simulating program with timing control, the write-in, test and debug operations can be easily performed with control program codes. Since the real-time simulation can be achieved by the present software platform, the cost required for hardware platform can thus be saved. Moreover, the software platform according to the present invention can be efficiently refreshed with the development of consumer electric produces at low cost.

Furthermore, specified time points are set with adjustable intervals therebetween according to the present invention. By adjusting an interval between adjacent specified time points, the simulating speed can be changed to comply with practical requirements. For example, for a stage that requires detailed reveal, the interval can be elongated to slow down the simulation. On the other hand, some stages may be skipped by shortening corresponding intervals. In other words, the hardware-simulating program is executable by different simulating speeds at different stages.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A timing control method of a hardware-simulating program, a plurality of simulating elements being defined in the hardware-simulating program, and the timing control method comprising steps of:
   a) executing the simulating elements in a first stage;
   b) suspending execution of any of the simulating elements that has been executed to a certain degree in the first stage;
   c) resuming execution of all the simulating elements suspended in the first stage to start a second stage when a first specified time point based on an external time coordinate is due;
   d) suspending execution of any of the simulating elements that has been executed to a further degree in the second stage; and
   e) resuming execution of all the simulating elements suspended in the second stage to start a third stage when a second specified time point based on the external time coordinate is due;
   wherein the first specified time point is adjustable to change a simulating speed of the hardware-simulating program in the first stage, and the second specified time point is adjustable to change a simulating speed of the hardware-simulating program in the second stage, independently from the first stage, so that the hardware-simulating program is executable by different simulating speeds at different stages.

2. The timing control method according to claim 1 wherein the external time coordinate is a system clock.

3. The timing control method according to claim 1 wherein the simulating speed of the hardware-simulating program is decreased by putting off the first specified time point in the external time coordinate, and increased by advancing the first specified time point in the external time coordinate.

4. The timing control method according to claim 1 wherein in the step b), it is determined that the simulating element has executed to the certain degree when an accumulated number of executed machine cycles of the simulating element reaches or exceeds a first threshold.

5. The timing control method according to claim 1 wherein the steps b) and c) are enabled by one of the simulating elements.

6. The timing control method according to claim 1 wherein in the step a), the simulating elements are executed in mixed program sections according to a predetermined sequence.

7. The timing control method according to claim 6 wherein the step a) further comprises sub-steps of:
   attaching time tags to simulation data associated with a specified simulating element;
   storing the simulation data into a queue; and
   reading out the simulation data from the queue according to the time tags when it is the turn of the specified simulating element to operate.

8. The timing control method according to claim 6 wherein the simulating elements are executed by the same microcontroller.

9. The timing control method according to claim 1 wherein the simulating elements are executed by respective microcontrollers.

10. A timing control method of a hardware-simulating program, a plurality of simulating elements being defined in the hardware-simulating program, and the timing control method comprising steps of:
    a) executing the simulating elements in a first stage;
    b) suspending execution of any of the simulating elements that has been executed to a certain degree in the first stage; and
    c) resuming execution of all the simulating elements suspended in the first stage to start a second stage when a first specified time point based on an external time coordinate is due;
    wherein the first specified time point is adjustable to change a simulating speed of the hardware-simulating program in the first stage, and the simulating speed of the hardware-simulating program is decreased by putting off the first specified time point in the external time coordinate, and increased by advancing the first specified time point in the external time coordinate.

* * * * *